(12) United States Patent
Lin et al.

(10) Patent No.: US 7,587,089 B2
(45) Date of Patent: Sep. 8, 2009

(54) METHOD AND APPARATUS FOR IMAGE PROCESSING

(75) Inventors: Kun-Wei Lin, Hsin Chu (TW); Chien-Chia Chien, Nan Tou County (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 692 days.

(21) Appl. No.: 11/362,337

(22) Filed: Feb. 27, 2006

(65) Prior Publication Data

US 2006/0221202 A1 Oct. 5, 2006

(30) Foreign Application Priority Data

Mar. 15, 2005 (TW) .............................. 94107762 A

(51) Int. Cl.
*G06K 9/56* (2006.01)
*H04N 5/228* (2006.01)
(52) U.S. Cl. ..................... 382/205; 382/284; 348/222.1
(58) Field of Classification Search .................. 382/168, 382/170, 205, 211, 270, 272, 284, 316, 254, 382/260, 266, 264, 274; 348/222.1, 229.1
See application file for complete search history.

(56) References Cited

U.S. PATENT DOCUMENTS 5,959,696 A * 9/1999 Hwang ........................ 348/678
6,069,979 A * 5/2000 VanMetter ................... 382/260
6,256,424 B1 * 7/2001 Murakami ................... 382/260
6,807,316 B2 * 10/2004 Enomoto ..................... 382/264

* cited by examiner

*Primary Examiner*—Daniel G Mariam
(74) *Attorney, Agent, or Firm*—Muncy, Geissler, Olds & Lowe, PLLC

(57) ABSTRACT

An image processing apparatus comprises a characteristic value generator for receiving image data, analyzing neighboring pixels of a to-be-processed pixel and calculating characteristic values comprising average illumination, illumination variability and histogram of illumination of a local image; a weighting generator for generating first and second weightings according to the characteristic values, wherein the first weighting is inversely proportional to the average illumination and directly proportional to the illumination variability, and the second weighting is relative to the histogram of illumination and illumination of the to-be-processed pixel; a first/second modulated illumination generator for generating first/second modulated illumination according to the illumination of the to-be-processed pixel; and a computation unit for generating first and second weighting illumination according to the first and second weightings and the first and second modulated illumination, and synthesizing the first and second weighting illumination together to output an image value.

7 Claims, 3 Drawing Sheets

METHOD AND APPARATUS FOR IMAGE PROCESSING

This application claims the benefit of the filing date of Taiwan Application Ser. No. 094107762, filed on Mar. 15, 2005, the content of which is incorporated herein by reference.

BACKGROUND OF THE INVENTION

1. Field of the Invention

The invention relates to an image processing method and an image processing apparatus, and more particularly to an image processing method and an image processing apparatus for re-mapping a local image dynamic response.

2. Description of the Related Art

An apparatus composed of a digital camera and other image processing apparatuses includes an image acquiring unit, an image processing unit, an image displaying unit and an image compressing unit. These units have different information amounts in processing with the same image source, and have image losses during the image processing procedure. Among these information losses, the gray-scale loss tends to eliminate the detail texture of the image. That is, the gray-scale loss tends to reduce the dynamic response range of the image processing apparatus. Especially, if the dynamic range of the gray-scale of the acquired image is very wide, for example, a flash is adopted or a back-lighted shot is performed, a detail brightness variation of the highlight or the shadow in the image generated at the last stage cannot be shown due to the insufficient information.

U.S. Pat. No. 6,256,424 (which is named '424 patent) discloses an image filter circuit utilizing the hardware architecture including an IIR-type low-frequency filter applied to generating an unsharp image for the dynamic range compression. The drawback of the '424 patent is that each edge of the processed image may become a pseudo-edge and cause distortion when the dynamic range compression ratio is large. U.S. Pat. No. 6,807,316 (which is named '316 patent) discloses an image processing method and an image processing apparatus using multiple low-frequency filters to generate an unsharp image applied to the dynamic range compression, and can thus eliminate the drawback of generating the pseudo-edge.

FIG. 1 shows the architecture of the image processing method and apparatus of the '316 patent. As shown in FIG. 1, the image processing apparatus utilize a first filtering process (Filtering Process 1) and a second filtering process (Filtering Process 2) to convert an input signal into a first unsharp image signal (Unsharp Image signal 1) and a second unsharp image signal (Unsharp Image signal 2), respectively. Then, a look-up-table synthesis (LUT Synthesis) is performed to synthesize the first unsharp image signal and the second unsharp image signal into a single image signal. Thereafter, a look-up-table computation (LUT Computation) is performed to generate a compensation signal. Finally, the input signal and the compensation signal are summated to generate an output signal.

The above-mentioned technology mainly utilizes a low-pass filter to separate a low-frequency signal from a high-frequency signal of an original image, and then reduces a gain of the low-frequency signal to compress the dynamic response range in the low-frequency area of the original image. Finally, the compressed low-frequency signal and the low-frequency area of the original image are synthesized such that the high-frequency signal (i.e., the detail texture) of the original image may be kept and the dynamic response range is also compressed within the range of the information amount that can be provided by an image processing unit. This technology has the drawback that the frequency response of all images is continuous. If some frequency simply serves as a dividing point for separating the low-frequency signal from the high-frequency signal, the final image may have the unsharp phenomenon as stated in the '424 patent. Thus, multiple dividing points corresponding to several stages of bands have to be used, as mentioned in the '316 patent, in order to try to reduce the unsharp phenomenon. In addition, this technology has another drawback that it is emphasized in the processing of the low-frequency dynamic response, and does not process the gains of the high-frequency signal in different highlight areas. Although this method can properly reduce the contrast ratio of the image with the high contrast ratio, it cannot provide a suitable gain for the high-frequency components of the image in the dark state and the highlight area. Thus, the final image becomes smooth but lacks the image fidelity.

SUMMARY OF THE INVENTION

It is therefore an object of the invention to provide an image processing method and an image processing apparatus for re-mapping a local image dynamic response.

To achieve the above-identified object, the invention provides an image processing apparatus including a characteristic value generator, a weighting generator, a first modulated illumination generator, a second modulated illumination generator and a computation unit. The characteristic value generator receives image data, locally analyzes neighboring pixels of a to-be-processed pixel, and calculates characteristic values comprising average illumination, illumination variability, and histogram of illumination of a local image. The weighting generator generates a first weighting and a second weighting according to the characteristic values. The first weighting is inversely proportional to the average illumination and directly proportional to the illumination variability, and the second weighting is relative to the histogram of illumination and illumination of the to-be-processed pixel. The first modulated illumination generator generates first modulated illumination by receiving the image data and calculating a maximum gain of a high gain dynamic response distribution curve according to the illumination of the to-be-processed pixel. The second modulated illumination generator generates second modulated illumination by receiving the image data and calculating a minimum gain of a low gain dynamic response distribution curve according to the illumination of the to-be-processed pixel. The illumination computation unit multiplies the first weighting and the first modulated illumination together to generate first weighting illumination, multiplies the second weighting and the second modulated illumination together to generate second weighting illumination, and synthesizes the first weighting illumination and the second weighting illumination to output an image value.

Thus, the method and mechanism for performing dynamic response re-mapping on an image according to the invention can eliminate the unsharp drawback caused in the prior art patents. Meanwhile, the invention also changes the gains of the high-frequency signals of images in different highlight areas. The invention increases a detail texture variation of the image by changing the dynamic response distribution of the image so as to reduce the reduction of the dynamic response range of the system, which is caused by the information loss during the image processing procedure, as well as to enhance the image fidelity due to the dynamic response re-mapping of the image.

DETAILED DESCRIPTION OF THE INVENTION

The method and apparatus for image processing according to the invention will be described with reference to the accompanying drawings.

The invention utilizes an image characteristic analyzer to locally analyze an image of neighboring pixels of a to-be-processed pixel so as to extract characteristic values including average illumination, illumination variability, and histogram of illumination. Then, the illumination of the to-be-processed pixel is adjusted according to the information. The gain for the adjustment is generated according to a default image dynamic response distribution curve.

The image dynamic response distribution curves include a high gain dynamic response distribution curve and a low gain dynamic response distribution curve. The gain for the to-be-processed pixel is restricted between the high gain dynamic response distribution and low gain dynamic response distribution curve. The invention can modulate the overall illumination of the image according to the changes of the high and low gain dynamic response distribution curves, and may also change the local gain intensity for different illumination.

Figure 1:
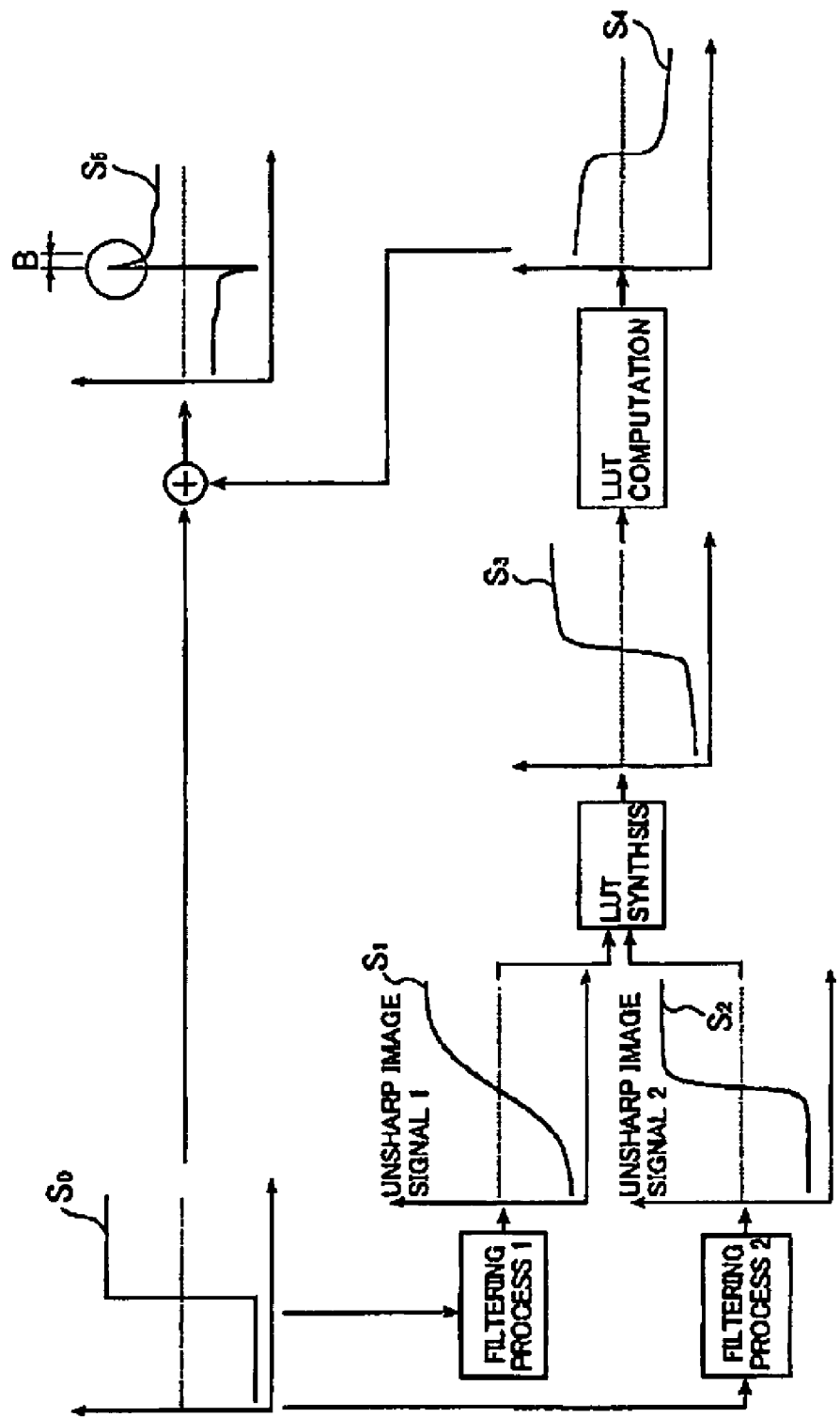
FIG. 1 shows the architecture of a conventional image processing apparatus.
Figure 2:
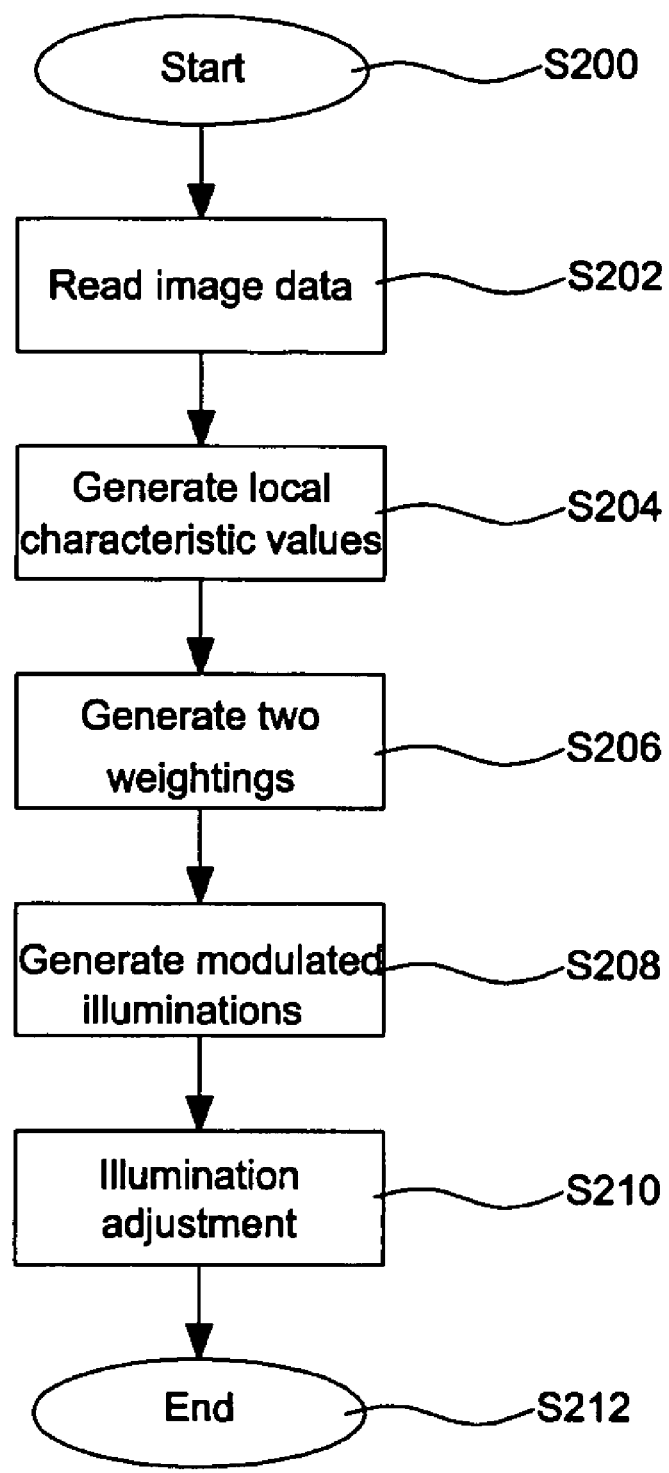
FIG. 2 shows a flow chart of an image processing method of the invention.

FIG. 2 is a flow chart showing an image processing method of the invention. Referring to FIG. 2, the method of the invention includes the following steps.

Step S200: start.

Step S202: read image data.

Step S204: generate local characteristic values by locally analyzing neighboring pixels of a to-be-processed pixel. An image characteristic analyzer is used to calculate local characteristic values of a local image. The local characteristic values include average illumination $\Delta y$, illumination variability $\delta \gamma$ and histogram of illumination.

Step S206: generate two weightings of high and low gain dynamic response distribution curves acting on the to-be-processed pixel according to the local characteristic values. The high gain dynamic response distribution curve can increase the illumination of the image, such as the illumination of the dark state area of the image. The low gain dynamic response distribution curve can reduce the illumination of the image so as to increase the contrast ratio of the image. In the embodiment of the invention, the weighting of the high gain dynamic response distribution curve is inversely proportional to the average illumination calculated by the characteristic analyzer, and directly proportional to the illumination variability. That is, when the local illumination variability in the dark state area of the image is large, the weighting of the high gain dynamic response distribution curve is increased, and the weighting of the low gain dynamic response distribution curve is relative to the histogram of illumination calculated by the characteristic analyzer and the illumination of the pixel. If the illumination of the pixel falls within the dark state area of the histogram, the weighting of the low gain dynamic response distribution curve is increased.

The first weighting is represented as:

$$\text{Weighting\_1} = c1*(2^d - \Delta y) + c2(\delta \gamma) \quad (1),$$

wherein c1 and c2 are constants, $2^d$ denotes the maximum gray-scale number of the image, $\Delta y$ denotes the average illumination and $\delta \gamma$ denotes the illumination variability. In this embodiment, c1=1 and c2=16. When the gray-scale number of the image is 256, d=8.

The second weighting is represented as:

$$\text{Weighting\_2} = c3*\text{position}(y \text{ at histogram}) \quad (2),$$

wherein c3 is a constant and c3=16 in this embodiment, and position (y at histogram) denotes the position of y in the histogram of illumination.

Step S208: generate the modulated illuminations. In this step, a maximum gain and a minimum gain of the high and low gain dynamic response distribution curves under this illumination are obtained according to the illumination of the to-be-processed pixel, and modulated illumination y1 and y2 are generated according to the two gains acting on the pixel, wherein y1 is the modulated illumination of the high gain dynamic response distribution curve, and y2 is the modulated illumination of the low gain dynamic response distribution curve.

Step S210: adjust the illumination. In this step, the two weightings are respectively multiplied by the modulated illumination y1 and y2 to generate weighting illumination y1' and y2'. Finally, the weighting illumination y1' and y2' are synthesized into single illumination y_out.

$$y1' = y1*\text{Weighting\_1} \quad (3)$$

$$y2' = y2*\text{Weighting\_2} \quad (4)$$

$$y\_out = y1' + y2' \quad (5)$$

Step S212: End.

The above-mentioned steps correspond to the processing of one pixel and may be repeated for other pixels.

Figure 3:
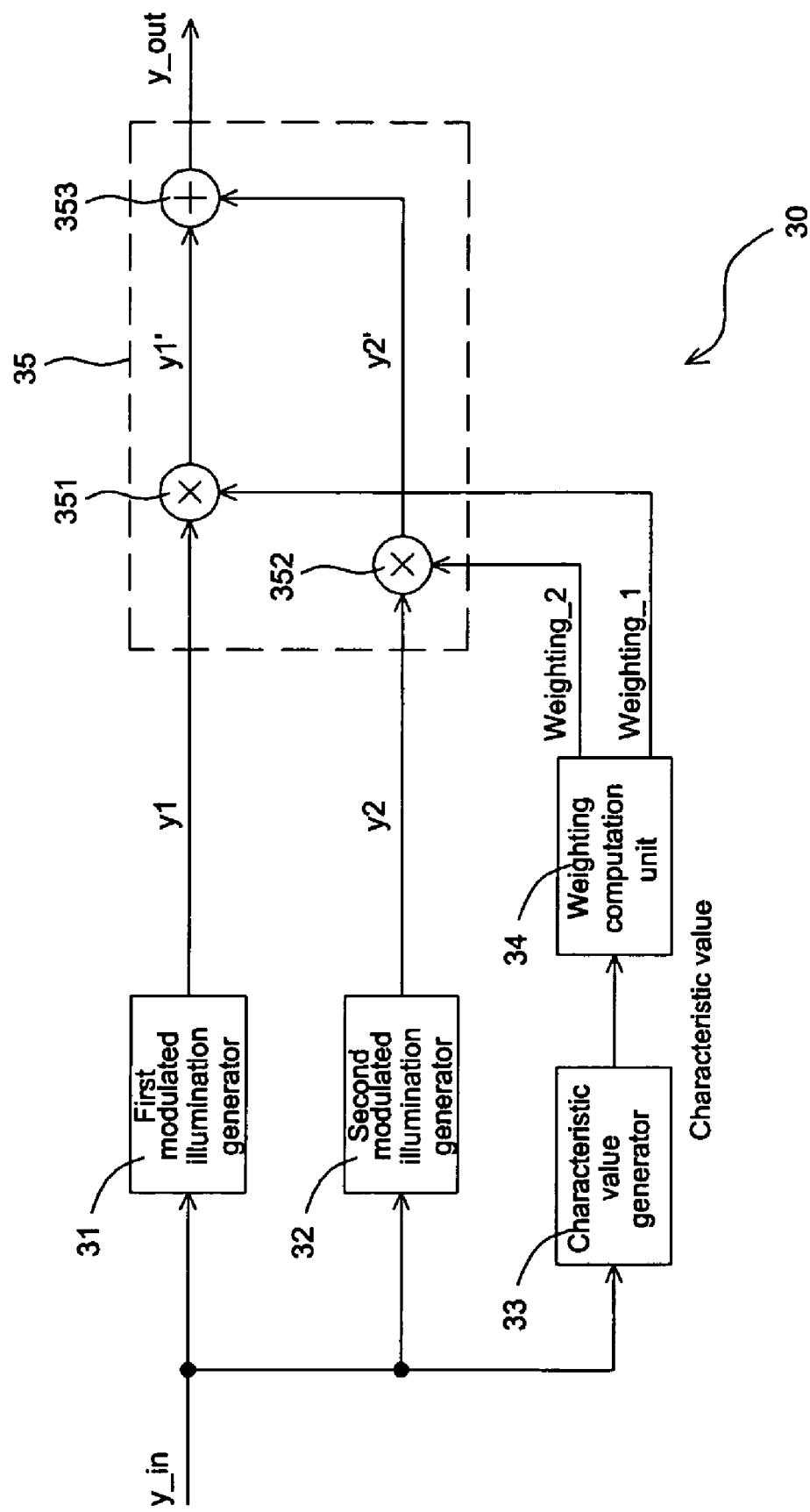
FIG. 3 shows the architecture of an image processing apparatus of the invention.

FIG. 3 shows the architecture of an image processing apparatus of the invention. As shown in FIG. 3, the image processing apparatus 30 includes a first modulated illumination generator 31, a second modulated illumination generator 32, a characteristic value generator 33, a weighting computation unit 34 and an illumination computation unit 35. The illumination computation unit 35 includes two multipliers 351 and 352, and one adder 353. The term "generator" or "unit" used herein is hardware and means a component of the image processing apparatus.

The first modulated illumination generator 31 and the second modulated illumination generator 32 receive the image data y_in simultaneously, respectively obtain a maximum gain of the high gain dynamic response distribution curve and a minimum gain of the low gain dynamic response distribution curve according to the illumination of the to-be-processed pixel, and generate modulated illumination y1 and y2 according to the two gains acting on the pixel. In general, the first modulated illumination generator 31 and the second modulated illumination generator 32 perform the so-called $\gamma$ curve adjustment, which pertains to the prior art and will not be described repeatedly. The parameters for the $\gamma$ curve adjustment can be set according to the preference of the user.

The characteristic value generator 33 generates the characteristic values according to the image data. That is, the characteristic value generator 33 locally analyzes the image around the to-be-processed pixel. The image characteristic analysis is performed on this local image signal and then the characteristic values of the local image are calculated. The characteristic values include average illumination $\Delta y$, illumination variability $\delta \gamma$ and histogram of illumination. The method of computing the average illumination $\Delta y$, the illumination variability δγ and the histogram of illumination of the image pertains to the prior art, and detailed descriptions thereof will be omitted. The so-called local image represents some pixels around the to-be-processed pixel, such at the pixels of an image in a 5*5 matrix around the to-be-processed pixel.

The weighting computation unit 34 respectively generates weightings Weighting_1 and Weighting_2 of the modulated illumination y1 and y2. The weighting computation unit 34 calculates the weightings Weighting_1 and Weighting_2 according to the characteristic values. The computing method is described as shown in Equations (1) and (2).

$$\text{Weighting\_1} = c1*(2^d - \Delta y) + c2(\delta \gamma) \quad (1),$$

wherein c1 and c2 are constants, $2^d$ denotes the maximum gray-scale number of the image, $\Delta y$ denotes the average illumination and $\delta \gamma$ denotes the illumination variability. In this embodiment, c1=1, c2=16, and d=8 if the gray-scale number of the image is 256.

$$\text{Weighting\_2} = c3*\text{position}(y \text{ at histogram}) \quad (2),$$

wherein c3 is a constant and position (y at histogram) denotes the position of y in the histogram of illumination.

The multiplier 351 multiplies the modulated illumination y1 and the weighting Weighting_1 together to generate a weighting illumination y1'. The multiplier 352 multiplies the modulated illumination y2 and the weighting Weighting_2 together to generate a weighting illumination y2'. Finally, the adder 353 adds the weighting illumination y1' and the weighting illumination y2' together to output an image y_out.

Thus, the invention can avoid the unsharp drawback caused by the dividing point of the band in the prior art. The invention also provides a way of changing the gain of the high-frequency signal of the image in different highlight areas. The invention increases the detailed texture variation of the image by changing the dynamic response distribution of the image so as to decrease the reduction of the dynamic response range of the system due to the information loss during the image processing procedures and thus to enhance the image fidelity due to the re-mapping of the dynamic response of the image.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. An image processing method applied in an image processing apparatus, comprising the steps of:
   analyzing neighboring pixels of a to-be-processed pixel to calculate local characteristic values, wherein the local characteristic values comprise average illumination, illumination variability and histogram of illumination of a local image;
   generating a first weighting and a second weighting according to the characteristic values, wherein the first weighting of a high gain dynamic response distribution curve is inversely proportional to the average illumination and directly proportional to the illumination variability, and the second weighting of a low gain dynamic response distribution curve is relative to the histogram of illumination and illumination of the to-be-processed pixel;
   generating a first modulated illumination of the high gain dynamic response distribution curve by calculating a maximum gain of the high gain dynamic response distribution curve according to the illumination of the to-be-processed pixel;
   generating a second modulated illumination of the low gain dynamic response distribution curve by calculating a minimum gain of the low gain dynamic response distribution curve according to the illumination of the to-be-processed pixel; and
   multiplying the first weighting and the first modulated illumination together to generate a first weighting illumination;
   multiplying the second weighting and the second modulated illumination together to generate a second weighting illumination; and
   synthesizing the first weighting illumination and the second weighting illumination to output an image value.

2. The method according to claim 1, wherein the first weighting is generated according to the following equation:
   weighting_1=c1*$(2^d-\Delta y)$+c2(δγ), wherein weighting_1 denotes the first weighting, c1 and c2 are constants, $2^d$ denotes a maximum gray-scale number of an image, $\Delta y$ denotes the average illumination, and δγ denotes the illumination variability.

3. The method according to claim 1, wherein the second weighting is generated according to the following equation:
   weighting_2=c3*position (y at histogram), wherein weighting_2 denotes the second weighting, c3 is a constant, and position (y at histogram) denotes the position of y in the histogram of illumination.

4. An image processing apparatus, comprising:
   a characteristic value generator for receiving image data, analyzing neighboring pixels of a to-be-processed pixel, and calculating characteristic values comprising average illumination, illumination variability, and histogram of illumination of a local image;
   a weighting generator for generating a first weighting and a second weighting according to the characteristic values, wherein the first weighting is inversely proportional to the average illumination and directly proportional to the illumination variability, and the second weighting is relative to the histogram of illumination and illumination of the to-be-processed pixel;
   a first modulated illumination generator for generating a first modulated illumination by receiving the image data and calculating a maximum gain of a high gain dynamic response distribution curve according to the illumination of the to-be-processed pixel;
   a second modulated illumination generator for generating a second modulated illumination by receiving the image data and calculating a minimum gain of a low gain dynamic response distribution curve according to the illumination of the to-be-processed pixel; and
   a computation unit for multiplying the first weighting and the first modulated illumination together to generate a first weighting illumination, multiplying the second weighting and the second modulated illumination together to generate a second weighting illumination, and synthesizing the first weighting illumination and the second weighting illumination to output an image value.

5. The apparatus according to claim 4, wherein the weighting generator generates the first weighting according to the following equation:
   weighting_1=c1*$(2^d-\Delta y)$+c2(δγ), wherein weighting_1 denotes the first weighting, c1 and c2 are constants, $2^d$ denotes a maximum gray-scale number of an image, $\Delta y$ denotes the average illumination, and δγ denotes the illumination variability.

6. The apparatus according to claim 4, wherein the weighting generator generates the second weighting according to the following equation:

weighting_2=c3*position (y at histogram), wherein weighting_2 denotes the second weighting, c3 is a constant, and position (y at histogram) denotes the position of y in the histogram of illumination.

7. The apparatus according to claim 4, wherein the computation unit comprises:

a first multiplier for receiving the first weighting and the first modulated illumination and multiplying the first weighting and the first modulated illumination together to generate the first weighting illumination;

a second multiplier for receiving the second weighting and the second modulated illumination and multiplying the second weighting and the second modulated illumination together to generate the second weighting illumination; and an adder for receiving the first weighting illumination and the second weighting illumination and adding the first weighting illumination and the second weighting illumination together to generate the image value.

* * * * *